United States Patent [19]

Cordes, III

[11] 4,111,873
[45] Sep. 5, 1978

[54] HEAT STABILIZED HALOGEN-CONTAINING POLYMERS

[75] Inventor: William Frederick Cordes, III, East Brunswick, N.J.

[73] Assignee: American Cyanamid Company, Stamford, Conn.

[21] Appl. No.: 693,468

[22] Filed: Jun. 7, 1976

[51] Int. Cl.$^2$ ............................ C08K 5/37; C08K 5/36
[52] U.S. Cl. ............................ 260/23 XA; 260/45.7 S; 260/45.8 SN; 260/45.75 W; 260/45.85 R
[58] Field of Search ................. 260/45.75 W, 23 XA, 260/45.85 R, 45.7 S, 45.8 S; 252/406

[56] References Cited

U.S. PATENT DOCUMENTS

| | | | |
|---|---|---|---|
| 3,010,937 | 11/1961 | Roos et al. | 260/45.8 RW |
| 3,225,001 | 12/1965 | Darsa | 260/45.75 R |
| 3,398,114 | 8/1968 | Pollock | 260/45.75 R |
| 3,544,510 | 12/1970 | Stapfer | 260/45.85 S |
| 3,661,844 | 5/1972 | Stapfer | 260/45.7 S |
| 3,890,276 | 6/1975 | Stapfer | 260/45.7 S |

OTHER PUBLICATIONS

British Plastics (1954) pp. 176–179.

*Primary Examiner*—V. P. Hoke
*Attorney, Agent, or Firm*—Philip Mintz; Frank M. Van Riet

[57] ABSTRACT

Thermal stability of halogen-containing polymers is improved by incorporation therein of (a) a compound of the formula:

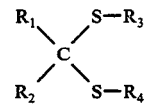

wherein $R_1$ and $R_2$ are independently selected from hydrogen, alkyl, aryl, alkyl- or alkoxy-substituted aryl, aralkyl, alkyl- or alkoxy-substituted aralkyl, or taken together form an alkylene radical of 3 to 9 carbon atoms; $R_3$ and $R_4$ are independently selected from alkyl of at least 4 carbon atoms, carbalkoxyalkyl, aryl, alkyl- or alkoxy-substituted aryl, aralkyl, alkyl- or alkoxy-substituted aralkyl or taken together form thiodimethylene, an ortho-arylene radical, an alkyl- or alkoxy-substituted ortho-arylene radical, or an alkylene radical of 2 to 4 carbon atoms; in combination with (b) a divalent metal salt of a carboxylic acid of 7 to 20 carbon atoms, or mixture of such metal salts.

26 Claims, No Drawings

HEAT STABILIZED HALOGEN-CONTAINING POLYMERS

BACKGROUND OF THE INVENTION

This invention relates to the stabilization of halogen-containing polymers against degradation on exposure to heat. More particularly, it relates to improving the thermal stability of halogen-containing polymers by incorporating therein an effective amount of a combination of a dithioketal of a carbonyl compound and a divalent metal salt, or mixture of divalent metal salts, of a carboxylic acid, or mixture of carboxylic acids, of 7 to 20 carbon atoms.

It is well known that halogen-containing polymers deteriorate upon exposure to elevated temperatures and that such deterioration is manifested by progressive discoloration of the polymer, generally from clear color-ess to pale yellow to reddish-brown to black. It is known to inhibit such thermal degradation by the addition of organotin stabilizers, such as those disclosed in U.S. Pat. No. 3,544,510 by Stapfer. Illustrative of such stabilizers are combinations of a mercaptal, such as distearyl 3,3′-(cyclohexylidenedithio) propionate, and a stannoic acid, such as butylstannoic acid, or alkylthiostannoic acid, such as butylthiostannoic acid. However, since all such stabilizer combinations found to date suffer from one deficiency or another, the search continues to discover better thermal stabilizer combinations for halogen-containing polymers.

SUMMARY OF THE INVENTION

In accordance with the present invention, it has been discovered that thermal stabilization of halogen-containing polymers can be achieved by incorporation therein of an effective amount of a combination of (a) a compound of the formula (I):

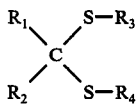
(I)

wherein $R_1$ $R_2$ are independently selected from hydrogen, alkyl, aryl, alkyl or alkoxy-substituted aryl, aralkyl, alkyl- or alkoxy-substituted aralkyl, or taken together form an alkylene radical of 3 to 9 carbon atoms; $R_3$ and $R_4$ are independently selected from alkyl of at least 4 carbon atoms, carb- alkoxyalkyl, aryl, alkyl- or alkoxy-substituted aryl, aralkyl, alkyl- or alkoxy-substituted aralkyl, or taken together form thiodimethylene, an ortho-arylene radical, an alkyl-or alkoxy-substituted ortho-arylene radical, or an alkylene radical of 2 to 4 carbon atoms, with (b) a divalent metal salt of a carboxylic acid of 7 or 20 carbon atoms or mixture of such metal salts.

Preferred compounds within the above definition are those represented by formula (II):

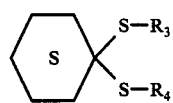
(II)

wherein $R_3$ $R_4$ are as previously defined and said salt is selected from calcium, magnesium, barium, or zinc benzoate, laurate, oleate, or stearate, or mixtures thereof.

Especially preferred compounds are those compounds represented by formula (II) wherein $R_3$ and $R_4$ are the same and are selected from alkyl of 8 to 18 carbon atoms, monocarbocyclic aryl and alkyl-substituted aryl, benzyl, and carbalkoxyalkyl, wherein the alkoxy group has 8 to 18 carbon atoms.

DESCRIPTION OF PREFERRED EMBODIMENTS

Representative compounds of formula (I), useful in the practice of the present invention, include the following:

1,1-bis(octadecylthio)cyclohexane
1,1-bis(hexadecylthio)cyclohexane
1,1-bis(dodecylthio)cyclohexane
1,1-bis(octylthio)cyclohexane
1,1-bis(butylthio)cyclohexane
1,1-bis(octylthio)cyclodecane
1,1-bis(phenylthio)cyclohexane
1,1-bis[(p-tert-butylphenyl)thio]cyclohexane
1.1′-bis[(p-methoxyphenyl)thio]cyclohexane
1,1-bis[(p-dodecylphenyl)thio]cyclohexane
1,1-bis(phenylmethylthio)cyclohexane
1,1-bis[[(p-tert-butylphenyl)methyl]thio]cyclohexane
1,1-bis[[(p-octadecylphenyl)methyl]thio]cyclohexane
1,1-bis[[(o-methoxyphenyl)methyl]thio]cyclohexane
1,1-bis[[(p-dodecyloxyphenyl)methyl]thio]cyclohexane
dimethyl 3,3′-(cyclohexylidenedithio)propionate
dioctyl 3,3′-(cyclohexylidenedithio)propionate
dioctadecyl 3,3′-(cyclohexylidenedithio)propionate
1,3-dithiolane
spiro(1,3-dithiolane-2,1′-cyclohexane)
2,2-dimethyl-1,3-dithiolane
4-methyl-2-phenyl-1,3-dithiolane
2,2-diphenyl-1,3-dithiolane
1,3-dithiane
2-phenyl-1,3-dithiane
2,2-diphenyl-1,3-dithiane
s-trithiane
1,1-bis(octadecylthio)-1-phenylethane
bis[[(p-tert-butylphenyl)methyl]thio]phenylmethane
bis[(p-dodecylphenyl)thio]methane
bis(hexadecylthio)methane
spiro (1,3-benzodithiole-2,1′-cyclohexane)
spiro (1,3-benzodithiole-2,1′-5′,5′-dimethyl-cyclohexane
spiro[naphtho(2,3-d)-1,3-dithiole-2,1′-cyclohexane]
naphtho(2,3-d)-1,3-dithiole, and the like In general, the compounds of the present invention can be prepared by condensation of a suitable ketone or aldehyde with 2 moles of a suitable thiol, or mixture of thiols, or 1 mole of a suitable dithiol, in the presence of an acid catalyst such as hydrogen chloride or para-toluene-sulfonic acid. The 3,3′-(cyclohexylidenedithio) propionic acid esters are prepared by condensing a ketone or aldehyde with a beta-mercaptopropionic acid ester in the presence of an acid catalyst such as hydrogen chloride or para-toluene-sulfonic acid. The preparation of bis(alkylthio) and bis(arylthio)methanes is disclosed by Lapkin et al, Zh. Org. Khim 3 (11), 2009 (1967), see Chemical Abstracts 68, 8695OY. The preparation of s-trithiane is disclosed by Yamamura et al, Japanese Pat. No. 7,007,060, see Chemical Abstracts 73, 3944d (1970) and by Mansfeld, Berichte 19, 696-702(1886). The preparation of various alkyl and aryl substituted s-tri-thianes is disclosed by Behringer et al, Ann. 600, 23-34 (1956), see Chemical Abstracts 51, 4311 h (1957). The preparation of various 2,2-substituted 1,3-dithiolanes is disclosed by Fuhrer et al in Helv. Chim. Acta. 45, 2036 (1962), see Chemical Abstracts 58:5482 h (1963).

Illustrative examples of suitable ketones and aldehydes which may be used to prepare the compounds of formula (I) are as follows:

cyclobutanone
cyclopentanone
cyclohexanone
cyclodecanone
benzophenone
acetophenone
benzaldehyde
4-methoxybenzophenone
formaldehyde
acetaldehyde
2-butanone
acetone
2-heptanone
4-octanone
2-undecanone
4-methoxybenzophenone
4,4'-dimethoxybenzophenone
2-methylbenzophenone
4-n-dodecylbenzophenone
4-phenyl-2-butanone
1,3-diphenylacetone
4-p-methoxyphenyl-2-butanone
1,3-bis(4-t-butylphenyl)acetone Illustrative examples of suitable thiols, or dithiols, which may be employed to prepare the compounds of formula (I) are the following:

benzenethiol
p-tert-butylbenzenethiol
p-methoxybenzenethiol
p-dodecylbenzenethiol
phenylmethanethiol
p-tert-butylphenylmethanethiol
p-octadecylphenylmethanethiol
o-methoxyphenylmethanethiol
p-dodecyloxyphenylmethanethiol
methyl-3-mercaptopropionate
octyl-3-mercaptopropionate
octadecyl-3-mercaptopropionate
1,2-ethanedithiol
1,4-butanedithiol
1,3-propanedithiol
1,2-propanedithiol
1,1'-thiodimethanedithiol
1-octadecanethiol
1-dodecanethiol
1-octadecanethiol
1-hexadecanethiol
1-cyclohexanethiol
1-butanethiol
1,2-benzenedithiol
2,3-naphthalenedithiol, and the like In accordance with the present invention, halogen-containing polymers, such as homopolymers and copolymers of vinyl chloride, vinylidene chloride, chlorinated polyolefins, and the like, particularly vinyl chloride and copolymers thereof containing at least 50 percent by weight of vinyl chloride units, can be stabilized against thermal degradation by the incorporation therein of compounds of formula (I) in admixture with a divalent metal salt of a carboxylic acid or mixture of carboxylic acids of 7 to 20 carbon atoms, preferably 12 to 20 carbon atoms, the weight ratio of said divalent metal salt to said compound being from about 1:20 to about 2:1, said compound being used in an amount of about 0.5 to about 5.0 percent, preferably about 1.0 to about 3.0 percent, on the weight of said halogen-containing polymer. Representative examples of suitable divalent metal salts include magnesium benzoate, calcium stearate, calcium laurate, zinc stearate, calcium oleate, calcium octoate, calcium 2-ethylhexoate, calcium ricinolate, calcium palmitate, barium stearate, magnesium stearate, barium laurate, and the like, and mixtures thereof.

Other additives also may be present in the halogen-containing polymer to modify it for its intended application, such as fillers, antioxidants, anti-static agents, lubricants, light stabilizers, pigments, dyes plasticizers, etc., as is conventional practice.

The compounds of this invention, along with other additives, if used, are readily incorporated into halogen-containing polymers by such conventional processes as casting, molding, extruding, milling, mixing, and the like.

The following examples are given to illustrate the present invention. All parts are by weight unless otherwise specified.

EXAMPLE 1

A solution of 4-t-butylthiophenol (33.2 grams; 0.2 mole) in cyclohexanone (9.8 grams; 0.1 mole) was cooled to 5° C and hydrogen chloride gas was bubbled into the solution while allowing the temperature to rise to 15–20° C. The addition of hydrogen chloride was then stopped while the solution was cooled to 5° C. The addition of hydrogen chloride was then initiated and the temperature was again allowed to rise to 15°–20° C. The solution was again cooled to 5° C and treated with hydrogen chloride. This was continued until no reaction exotherm was observed at which point the addition of hydrogen chloride was continued for another hour. The reaction mixture was dissolved in 150 mls. of diethyl ether and the ethereal solution was washed successively with aqueous sodium hydroxide until the aqueous layer remained basic and with water until the aqueous layer was neutral. The ethereal layer was dried over anhydrous magnesium sulfate and the ether was evaporated to obtain a yellow oil.

The yellow oil was chromatographed on a column of alumina using hexane as an eluant to obtain a white solid which was identified as 1,1-bis[(p-tert-butylphenyl) thio]cyclohexane; m.p. 74°–76° C after recrystallization from isopropanol.

Analysis: - Calculated for $C_{26}H_{36}S_2$ (percent): C, 75.66; H, 8.80; S, 15.54. Found (percent): C, 76.10; H, 8.99; S, 15.39.

EXAMPLE 2

A solution containing benzophenone (45.5 grams; 0.25 mole), 1,2-ethanedithiol (23.5 grams; 0.25 mole), and p-toluenesulfonic acid (1 gram) in 150 mls. of dry benzene was heated at reflux until no more water was azeotroped off. The remaining benzene was then evaporated and the residue was dissolved in diethyl ether.

The ethereal solution was then washed with water, dried over anhydrous magnesium sulfate, filtered and evaporated to obtain 2,2-diphenyl-1,3-dithiolane, a white crystalline solid which melted at 104°–105° C. A different preparation of this same compound is described in Fasbender, Berichte 21, 1473-7, (1888), wherein the melting point is reported as 106° C.

EXAMPLE 3

The procedure of Example 1 was used to react cyclohexanone (9.8 grams; 0.1 mole) and 1-octadecanethiol (57.2 grams; 0.2 mole) except that the solution was warmed to 35° C prior to adding hydrogen chloride and the temperature was allowed to rise to 50° C. The addition of hydrogen chloride was continued until no exotherm was observed. At this point 50 mls. of hexane were added, the solution was cooled to 35° C and addition of hydrogen chloride was continued until solidification occurred. The solid was dissolved in a mixture of chloroform and diethyl ether, washed with aqueous caustic and then with water until neutral. The ethereal solution was then dried over magnesium sulfate, filtered and evaporated to obtain a white solid which was identified as 1,1-bis(octadecylthio)cyclohexane, melting point 49–51° C after recrystallization from hexane.

Analysis: Calculated for $C_{42}H_{84}S_2$ (percent): C, 77.22; H, 12.96; S, 9.82. Found (percent): C, 77.50, H, 12.89; S, 9.61.

EXAMPLE 4

The procedure of Example 1 was used to react cyclohexanone (8.15 grams; 0.083 mole) and 1-octanethiol (24.2 grams; 0.166 mole). After evaporating the ether a very pale yellow liquid was obtained which was identified as 1,1-bis(octylthio)cyclohexane.

Analysis: Calculated for $C_{22}H_{44}S_2$ (percent): C, 70.93; H, 11.89; S, 17.18. Found (percent): C, 71.40; H, 11.79; S, 16.91.

EXAMPLE 5

The procedure of Example 1 was used to react cyclohexanone (12.5 grams; 0.127 mole) and α-toluenethiol (31.0 grams; 0.249 mole). After evaporating the ether the residual oil was distilled under vacuum and the fraction boiling at 197°–199° C at 0.15 mm. was collected and identified as 1,1-bis(phenylmethylenethio)cyclohexane.

Analysis: Calculated for $C_{20}H_{24}S_2$ (percent): C, 73.11, H, 7.36; S, 19.52. Found (percent): C, 73.13; H, 7.09; S, 20.30.

EXAMPLES 6 TO 10

To each of five different 16.7% of Geon® 103EP polyvinyl chloride in tetrahydrofuran was added an amount of a compound of Examples 1 to 5, respectively, to provide 3% by weight of compound on the weight of polyvinyl chloride and a film was cast therefrom and dried. Each film was then exposed to heat at 193.3° C (380° F) in a press under a pressure of fifteen tons for twenty minutes, after which each film was observed for discoloration. As noted before, thermal degradation of polyvinyl chloride is accompanied by progressive discoloration of the polymer from clear colorless through various stages to black.

After exposure to heat the films containing 3% by weight of the compounds of Examples 1 to 4 inclusive were colored reddish-brown; the film containing 3% by weight of the compound of Example 5 was a pale brown color. In all cases control films similarly made and tested without addition of any such compound were colored reddish-brown. It is thus seen that, when used alone, these compounds are incapable of effectively stabilizing polyvinyl chloride against thermal degradation.

EXAMPLES 11 TO 15

The procedure of Examples 6 to 10 was used to test the combinations of each of the compounds of Examples 1 to 5 with a mixture containing 36% by weight calcium stearate, 20% by weight magnesium benzoate, 8% by weight zinc stearate and 36% by weight pentaerythritol. The concentration of each of the compounds of Examples 1 to 5, was between 1 and 2% on the weight of polyvinyl chloride with sufficient of said mixture containing the metal salts being added to obtain a total concentration of 3% of the total combination on the weight of the polyvinyl chloride.

In all cases the films were found to be colorless after exposure to heat by the test described in Examples 6 to 10. Control films similarly made and tested which contained 1 to 2% by weight of the mixture containing the calcium stearate, magnesium benzoate, zinc stearate and pentaerythritol, described hereinabove, on the weight of polyvinyl chloride were colored pale red-brown. It is thus seen that, although the mixture containing the metal salts was ineffective, the combinations thereof with the compounds of Examples 1 to 5 were very effective as thermal stabilizers for polyvinyl chloride.

EXAMPLES 16 to 19

The procedure of Examples 6 to 10 was used to test s-trithiane or dioctyl 3,3'-(cyclohexylidenedithio)-dipropionate in combination with the mixture of metal salts described in Examples 11 to 15. The concentration of s-trithiane or dioctyl 3,3'-(cyclohexylidenedithio)dipropionate employed was either 1 or 2% on the weight of polyvinyl chloride with sufficient of said mixture containing said metal salts and pentaerythritol being added to obtain a total concentration of each conbination of 3% on the weight of the polyvinyl chloride. The results obtained are shown below in Table I.

Table I

| Example | Additive | Color of Film |
|---|---|---|
| 16 | 2% s-trithiane | colorless |
| 17 | 1% s-trithiane | colorless |
| 18 | 2% dioctyl 3,3'-(cyclohexylidenedithio)dipropionate | colorless |
| 19 | 1% dioctyl 3,3'-(cyclohexylidenedithio-propionate | colorless |

Control films, containing only the additive, similarly made and tested, are colored reddish-brown. It is thus seen that these two additives, each in combination with the metal salts, are also effective thermal stabilizers for polyvinyl chloride.

EXAMPLES 20 to 22

The procedure of Examples 6 to 10 was used to test the combinations of the compound of Example 1 with calcium stearate or magnesium benzoate. The results obtained are reported in Table II below.

Table II

| Example | Additive | Color of Film |
|---|---|---|
| 20 | 2.6% Product of Example | colorless |

Table II-continued

| Example | Additive | Color of Film |
|---|---|---|
| 21 | 1; 0.4% Calcium Stearate 2.8% Product of Example 1; 0.2% Magnesium Benzoate | colorless |
| 22 | 2.4% Product of Example 1; 0.6% Magnesium Benzoate | colorless |

It is thus seen that the combination stabilizers useful for thermally stabilizing polyvinyl chloride (a) need not contain pentaerythritol and (b) can contain only a single metal salt rather than a mixture of metal salts and still achieve effective thermal stabilization.

We claim:
1. A thermally stable composition comprising a halogen-containing polymer selected from the group consisting of homopolymers and copolymers of vinyl chloride, vinylidene chloride or chlorinated polyolefins and an effective stabilizing amount of a combination of (a) a compound of the formula:

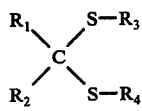

wherein $R_1$ and $R_2$ are independently selected from hydrogen, alkyl, aryl, alkyl- or alkoxy-substituted aryl, aralkyl, alkyl- or alkoxy-substituted aralkyl, or taken together form an alkylene radical of 3 to 9 carbon atoms; $R_3$ and $R_4$ are independently selected from alkyl of at least 4 carbon atoms; carbalkoxyalkyl, aryl, alkyl- or alkoxy-substituted aryl, aralkyl, alkyl- or alkoxy-substituted aralkyl, or taken together form thiodimethylene, an ortho-arylene radical, an alkyl- or alkoxy-substituted ortho-arylene radical, or an alkylene radical of 2 to 4 carbon atoms, and (b) a divalent metal salt selected from magnesium, calcium, barium or zinc stearate, laurate, oleate or benzoate, or mixtures thereof.

2. A composition according to claim 1 wherein the amount of said compound is 0.5 to 5.0 percent on the weight of said polymer.

3. A composition according to claim 1 wherein $R_1$ and $R_2$ taken together form a pentamethylene radical.

4. A composition according to claim 3 wherein said salt is selected from calcium, stearate, laurate, oleate, or benzoate, or mixtures thereof.

5. A composition according to claim 1 wherein $R_1$ and $R_2$ taken together form pentamethylene, and $R_3$ and $R_4$ are the same and selected from alkyl of 8 to 18 carbon atoms, monocarbocyclic aryl nd alkyl-substituted monocarbocyclic aryl, benzyl, and carbalkoxyalkyl, wherein the alkoxy group contains from 8 to 18 carbon atoms.

6. A composition according to claim 5 wherein said salt is selected from calcium, stearate, laurate, oleate, or benzoate, or mixtures thereof.

7. A composition according to claim 1 wherein said compound is 1,1-bis[(p-tert-butylphenyl)thiol] cyclohexane.

8. A composition according to claim 1 wherein said compound is 2,2-diphenyl-1,3-dithiolane.

9. A composition according to claim 1 wherein said compound is 1,1-bis (octadecylthio) cyclohexane.

10. A composition according to claim 1 wherein said compound is 1,1-bis(octylthio) cyclohexane.

11. A composition according to claim 1 wherein said compound is 1,1-bis(phenylmethylenethio)cyclohexane.

12. A composition according to claim 1 wherein said compound is s-trithiane.

13. A composition according to claim 1 wherein said compound is dioctyl 3,3'-(cyclohexylidenedithio)dipropionate 14. A composition as defined in claim 1 wherein said polymer is a polymer of vinyl chloride.

15. A stabilizer composition comprising, in combination, (a) a compound of the formula:

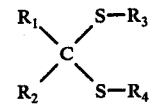

wherein $R_1$ and $R_2$ are independently selected from hydrogen, alkyl, aryl, alkyl- or alkoxy-substituted aryl, aralkyl, alkyl- or alkoxy-substituted aralkyl, or taken together form an alkylene radical of 3 to 9 carbon atoms; $R_3$ and $R_4$ are independently selected from alkyl of at least 4 carbon atoms; carbalkoxyalkyl, aryl, alkyl- or alkoxy-substituted aryl, aralkyl, alkyl- or alkoxy-substituted aralkyl, or taken together form thiodimethylene, an ortho-arylene radical, an alkyl- or alkoxy-substituted ortho-arylene radical, or an alkylene radical of 2 to 4 carbon atoms, and (b) a divalent metal salt selected from magnesium, calcium, barium or zinc stearate, laurate, oleate or benzoate or mixtures thereof, the ratio of (b) to (a) being from about 1:20 to about 2:1, respectively.

16. A stabilizer composition according to claim 15 wherein $R_1$ and $R_2$ taken together from a pentamethylene radical.

17. A stabilizer composition according to claim 16 wherein said salt is selected from calcium, stearate, laurate, oleate, or benzoate, or mixtures thereof.

18. A stabilizer composition according to claim 15 wherein $R_1$ and $R_2$ taken together form pentamethylene, and $R_3$ and $R_4$ are the same and selected from alkyl of 8 to 18 carbon atoms, monocarbocyclic aryl and alkyl-substituted monocarbocyclic aryl, benzyl, and carbalkoxyalkyl, wherein the alkoxy group contains from 8 to 18 carbon atoms.

19. A stabilizer composition according to claim 18 wherein said salt is selected from calcium, stearate, laurate, oleate, or benzoate, or mixtures thereof.

20. A stabilizer composition according to claim 15 wherein said compound is 1,1-bis[(p-tert-butylphenyl)thio] cyclohexane.

21. A stabilizer composition according to claim 15 wherein said compound is 2,2-diphenyl-1,3-dithiolane.

22. A stabilizer composition according to claim 15 wherein said compound is 1,1-bis(octadecylthio)cyclohexane.

23. A stabilizer composition according to claim 15 wherein said compound is 1,1-bis(octylthio)cyclohexane.

24. A stabilizer composition according to claim 15 wherein said compound is 1,1-bis(phenylmethylenethio)cyclohexane.

25. A stabilizer composition according to claim 15 wherein said compound is s-trithiane.

26. A stabilizr composition according to claim 15 wherein said compound is dioctyl 3,3'-(cyclohexylidenedithio)dipropionate.

* * * * *